United States Patent [19]

Corwin

[11] 3,790,893

[45] Feb. 5, 1974

[54] SAMPLE AND HOLD CIRCUIT FOR DIGITAL SIGNALS

[75] Inventor: Walter Leo Corwin, Freehold, N.J.

[73] Assignee: Bell Telephone Laboratories, Incorporated, Murray Hill, N.J.

[22] Filed: Nov. 16, 1972

[21] Appl. No.: 307,034

[52] U.S. Cl. .................... 328/151, 328/74, 328/127
[51] Int. Cl. .................... H03k 5/00
[58] Field of Search .................... 328/151, 127, 74

[56] References Cited

UNITED STATES PATENTS

| | | | |
|---|---|---|---|
| 3,252,099 | 5/1966 | Dodd | 328/151 X |
| 3,416,087 | 12/1968 | Vargiu | 328/151 |
| 3,602,825 | 8/1971 | Senior | 328/151 X |
| 3,731,209 | 5/1973 | Satterfield | 328/151 |

*Primary Examiner*—John S. Heyman
*Attorney, Agent, or Firm*—John K. Mullarney

[57] ABSTRACT

A sample and hold circuit wherein the digital signal to be sampled is differentially applied to a pair of gated transistors. Once during each time slot, the transistor pair is gated to provide a sampling aperture during which an integration of the digital signal is performed. The results of each integration are evaluated to determine whether a pulse (or a space) occurred in the digital signal during the time slot.

7 Claims, 3 Drawing Figures

SAMPLE AND HOLD CIRCUIT FOR DIGITAL SIGNALS

BACKGROUND OF THE INVENTION

This invention relates to digital transmission systems and, more particularly, to a digital signal, sample and hold circuit capable of highly accurate operation on noisy high speed signals.

One of the principle advantages of digital transmission is that the digital signal is regenerated at convenient points along the transmission medium without any cumulative effects of noise. Each regenerator, in the digital transmission system, is synchronized to evaluate the received pulse stream once during each time slot to discriminate between a pulse or space in that time slot. The decision as to whether a pulse exists within a time slot is crucial, i.e., the outcome of the decision is either completely correct or completely wrong. The increase in the speed of signals necessary to keep pace with the ever increasing demand for more efficient and reliable communication systems for voice, video, and data information has made it more difficult to achieve accurate decisions. Specifically, conventional digital signal, sample and hold circuits are forced to make the decisions that discriminate between the absence or presence of a pulse at faster and faster rates, which directly reduce the time in which each crucial decision is to be made. As a result, those in the art find it increasingly difficult to provide sample and hold circuits which yield low error rates in the recognition and the regeneration of high speed digital signals.

Digital signal, sample and hold circuits are traditionally designed to make decisions based upon the signal present in a sampling aperture of a duration which is only a small fraction of a complete digital signal time slot. It has generally been assumed that short sampling apertures are necessary to make accurate decisions. Unfortunately, sample and hold circuits designed to meet this objective are increasingly forced to operate at speeds where the parasitic time constants of the circuits become a significant portion of the sampling aperture. This parasitic effect further reduces the effective duration of the sampling aperture. Furthermore, special high speed pulse circuits of increasing complexity are required to provide well-formed pulses of extremely short duration to define the sampling aperture of the prior art samplers.

When conventional sample and hold circuits are operated using wide signal sampling apertures, the performance is degraded by noise. During the sampling aperture, the noise is fed through the sampling circuit while the decision is being made as to whether a pulse has been received.

Accordingly, it is a primary object of the present invention to enable accurate sampling of a digital signal based upon a substantial portion of the digital signal received in each time slot.

A related object is to regenerate an accurate digital signal from a sampling circuit which does not require well-formed aperture-defining pulses of extremely short duration.

A more specific object of the invention is to provide a sampling circuit capable of highly accurate performance on noisy, high speed digital signals.

SUMMARY OF THE INVENTION

In an illustrative embodiment of the invention, the digital signal to be evaluated is sampled using a sampling aperture that is substantially one-half the duration of a digital signal time slot. The digital signal that occurs during the sampling aperture is linearly integrated to obtain an "integral" voltage. The integral is evaluated by a non-linear transfer and hold circuit to determine if a pulse was present in the digital signal during the sampling aperture. After the evaluation of the integral, the presence of a pulse is indicated by a predetermined state of the transfer and hold circuit. If, on the other hand, a pulse was not present (i.e., a space), the transfer and hold circuit will be in its opposite state after the evaluation. During continuous operation, the transfer and hold circuit provides an output signal that is a regenerated version of the digital signal applied to the input of the sampling circuit. After each integral is evaluated by the transfer and hold circuit, the apparatus which performed the linear integration is reset before the next succeeding sampling aperture. This allows each integral to be formed by integrating the signal over the sampling aperture independently of the previous integral. By sampling the input signal over longer than conventional intervals and by forming an integral of the sampled signal, a more accurate performance is realized in the evaluation of digital signals.

It is a feature of the invention that a large portion (i.e., one-half) of the signal in each time slot is used to form the linear integral which is used to regenerate the digital signal.

BRIEF DESCRIPTION OF THE DRAWINGS

The invention will be more fully appreciated from the following detailed description when considered in connection with the accompanying drawings in which.

DETAILED DESCRIPTION

Figure 1:
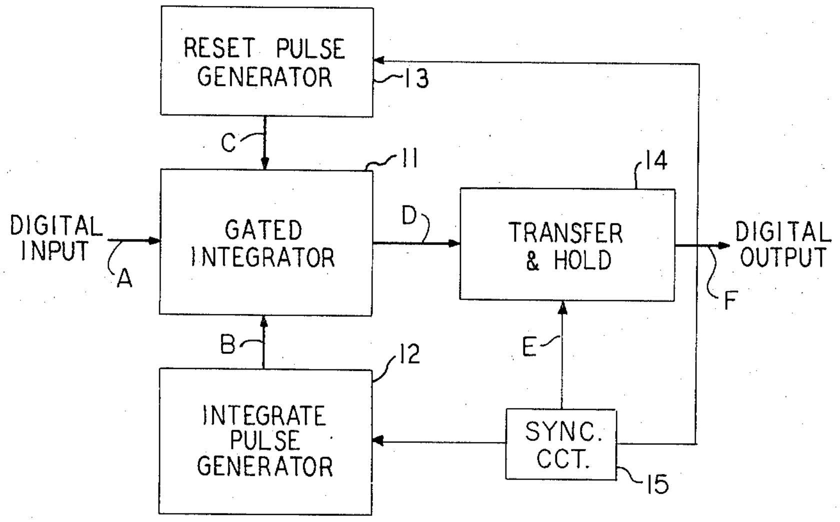
FIG. 1 is a block diagram of the apparatus for the sampling and regeneration of digital signals in accordance with the present invention.

Turning now to FIG. 1 of the drawings, the regenerative sample and hold circuit of the invention is shown to comprise a gated integrator 11 which receives an input digital signal. An integrate pulse generator 12 and a reset pulse generator 13 also supply signals to the gated ingegrator 11, for purposes to be described. The output signal from the gated integrator 11 is applied to a non-linear transfer and hold circuit 14 which provides the regenerated digital signal. The integrator 11 is operatively gaged once during each time slot of the received digital signal by the integrator pulse generator 12 and by the reset pulse generator 13, which are synchronized by a synchronization circuit 15. The transfer and hold circuit 14 is also operatively synchronized by the synchronization circuit 15. The detailed operation of the sample and hold circuit shown in FIG. 1 will be explained in connection with the following discussion of FIGS. 2 and 3. The reference letters A–F in FIG. 1 and in FIG. 2 have reference to the several waveforms of FIG. 3.

Figure 2:
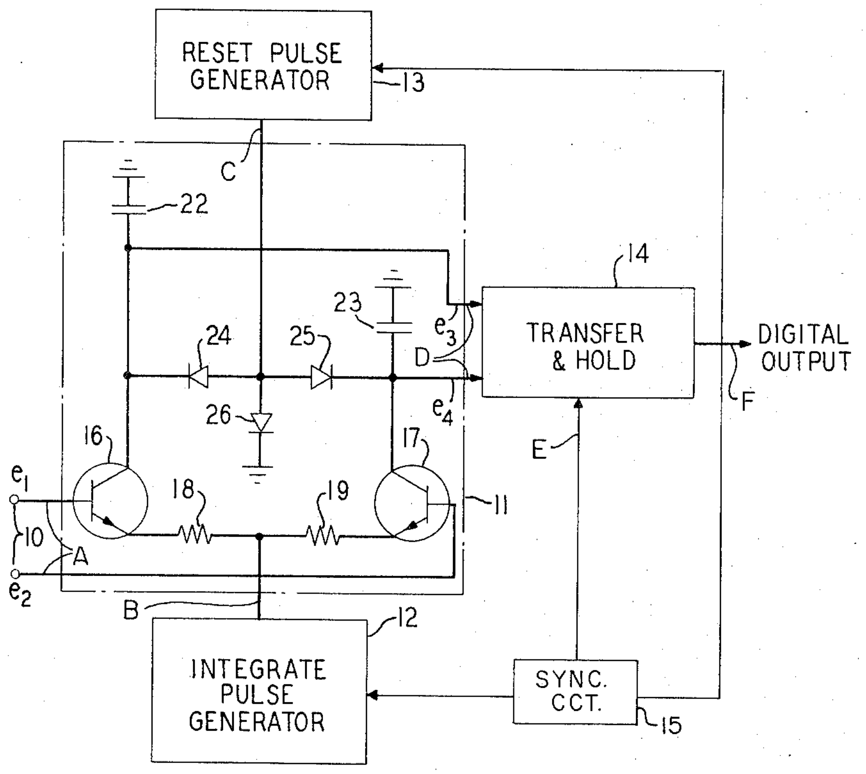
FIG. 2 is a more detailed diagram of the invention.

FIG. 2 shows an illustrative schematic diagram of the gating integrator 11 of FIG. 1. The digital input signal ($e_1$) and its complement ($e_2$) are applied to input terminals 10 of the gated integrator 11. The reset pulse generator 13, the integrate pulse generator 12 and the transfer and hold circuit 14 are connected to the gated integrator 11 in the manner shown in FIG. 2. The gated integrator 11 comprises transistors 16 and 17, which have their emitters connected through resistors 18 and 19 to the integrate pulse generator 12. Capacitors 22 and 23 are respectively connected between the collectors of transistors 16 and 17 and ground potential. The reset pulse generator 13 is connected to a diode network comprising diodes 24, 25, and 26 which have their cathodes individually connected to the collectors of transistors 16 and 17 and to ground, respectively. The collectors of transistors 16 and 17 supply the requisite charging signals for the capacitors. The charge in capacitors 22 and 23 is then evaluated by the transfer and hold circuit 14.

Figure 3:
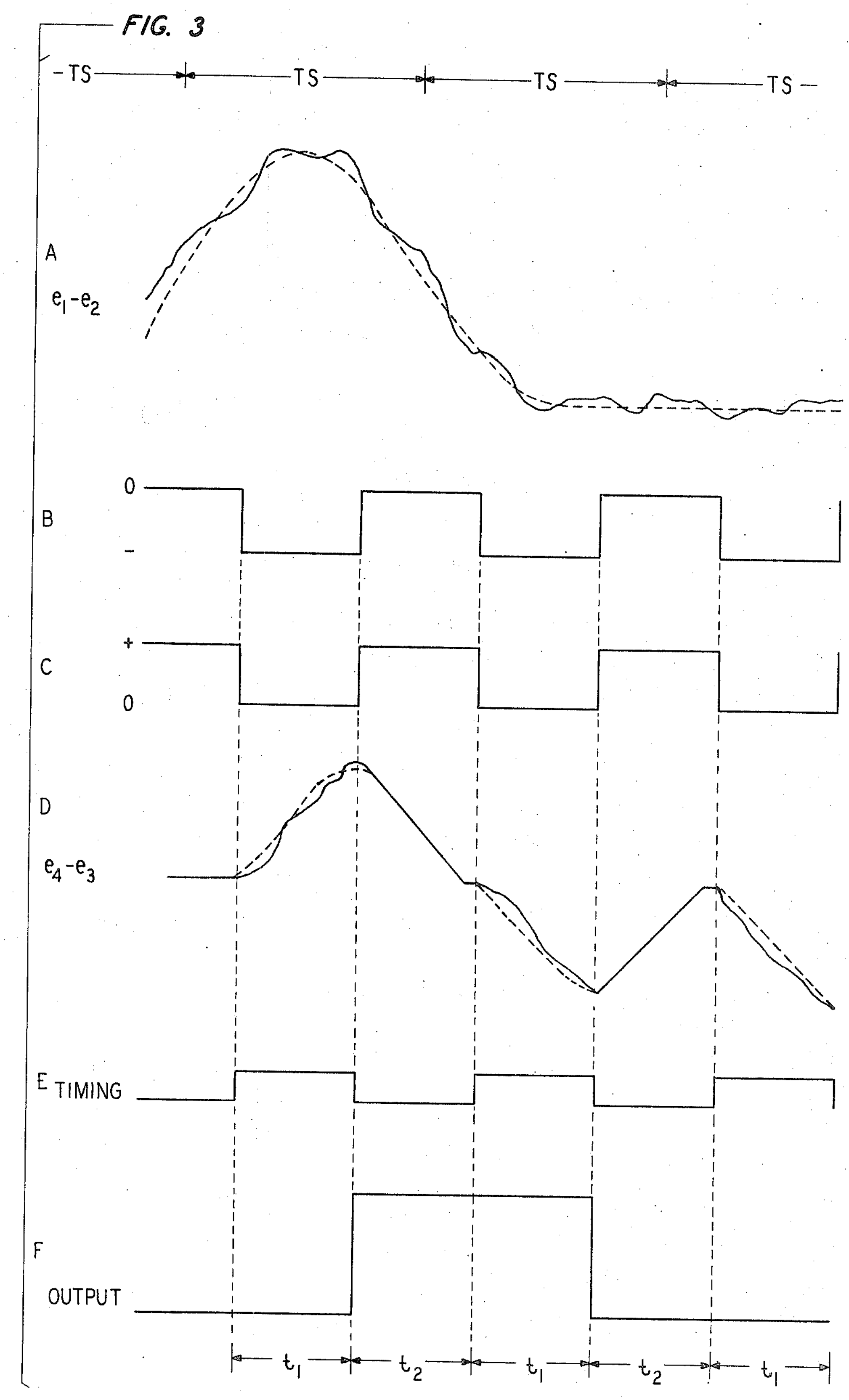
FIG. 3 is a diagram of certain waveforms useful in the explanation of the invention.

FIG. 3 depicts waveforms that illustrate the operation of the circuit shown in FIG. 2. A differential version (i.e., $e_1$–$e_2$) of the complementary digital signals applied to the input terminals 10 of the gated integrator 11 is shown at A, in FIG. 3. The dotted waveform here represents a noise free signal, while the solid waveform represents the waveform for an actual received signal which contains noise. The digital signal may typically represent a received signal after the same has been equalized. In this assumed case, the received digital signal, which occupies designated time slots, has a pulse sequence of space, pulse, space, and space, or −1, +1, −1, and −1.

The waveform of the output current of the integrate pulse generator 12 is shown by waveform B. During the negative portions of waveform B, corresponding to intervals designated $t_1$, transistors 16 and 17 in FIG. 2 are supplied an operating current for conduction. During the intervals $t_1$, the differential input signal, shown by the solid waveform A, controls the distribution of collector current between transistors 16 and 17. These collector currents charge capacitors 22 and 23 to produce the differential voltage waveform D. The capacitors 22 and 23 thus effectively generate an "integral" voltage by performing an integration of the digital signal input during predetermined intervals ($t_1$). In waveform D, the dotted and solid lines respectively represent a noise free signal and the received signal. The advantage of the integration process is that it averages out the noise to effectively eliminate its effect without affecting the signal. The values of resistors 18 and 19, in series with the transistor pair of FIG. 2, are selected to insure that the integration is linear. For example, each resistor may have 60 ohms resistance. The intervals $t_1$ are commonly known as either sampling intervals or sampling apertures. It should be noted that the portion of the input signal used in the sampling process represents a significant portion (i.e., one-half) of the signal which occupies a time slot.

At the end of each sampling interval, a negative transition occurs in the timing waveform depicted by the waveform E of FIG. 3. This signal is applied to the transfer and hold circuit 14 of FIG. 2. The occurrence of negative transitions in the timing waveform E causes the transfer and hold circuit 14 to evaluate the differential voltage waveform that is applied to its input. As was previously suggested, the signals represented by waveforms B, C, and E are synchronized to each other and to the received digital signal by the synchronization circuit 15. After each evaluation, the transfer and hold circuit 14 assumes a state based upon the integral stored in capacitors 22 and 23. The non-linear transfer and hold circuit 14 may comprise a conventional "master-slave" flip-flop circuit. Such a circuit typically has two inputs (i.e., a data signal input and a clock input) and a single output. When a predetermined transition occurs in the clock signal, the circuit rapidly assumes one of two given states depending upon the data input. Circuits of this nature are quite fast-acting and they are commercially available. The transfer and hold circuit 14 provides the digital output signal depicted by waveform F. For each time slot, the value of the integral is produced by accumulating the digital signal over the duration of the sampling interval. The presence or absence of a pulse in that time slot thus determines the value of the integral which, in turn, controls the state of the transfer and hold circuit 14. Each state assumed by the transfer and hold circuit 14 is maintained until the next negative transition in the timing waveform E. In this manner, the state of the transfer and hold circuit 14 provides an output signal which is a regenerated version of the received digital signal.

After the integral is evaluated by the sample and hold circuit 14, the reset generator 13 provides a positive current pulse which ends before the next sampling interval. The waveform of these current pulses is shown at C in FIG. 3 wherein the reset intervals are designated $t_2$. The reset signal current flows through diodes 24, 25, and 26 in FIG. 2. The signal current dissipates the integral stored in capacitors 22 and 23 (i.e., the capacitors are short-circuited and thus discharged by the conducting diodes). Diode 26, which bypasses excessive current to ground, prevents these capacitors from being charged by the reset pulse generator 13. The current pulses supplied by the reset pulse generator 13 should be of sufficient magnitude to completely neutralize the charge in capacitors 22 and 23. This insures that the charge differential, or integral, stored in capacitors 22 and 23 is only the result of the differential signal input which occurs during the sampling interval.

In the illustrative embodiment of the invention, equal intervals were selected for $t_1$ and $t_2$. This allows the same amount of time for the charging and for the resetting of capacitors 22 and 23. It should be understood, however, that this selection is arbitrary and the only constraint is that the total of the charging and resetting intervals does not exceed the duration of a time slot of the digital signal. It must also be understood that the gated integrator 11 can be operatively controlled using other than square waves. In fact, the waveform of the integrate pulse generator 12 may be shaped to perform a weighting function over the sampling aperture. Accordingly, it is to be understood that the foregoing described arrangements are merely illustrative of the principles of the present invention. Numerous and varied other modifications of sample and hold circuits in accordance with these principles may readily be devised by those skilled in the art without departing from the spirit and scope of the invention.

What is claimed is:

1. In a digital transmission system operating on digital signals occupying predetermined time slots, a digital signal regenerator comprising sampling means having a sampling interval with a duration equal to a substantial portion of the duration of a time slot, said digital signals being coupled to said sampling means;

linear means for linearly integrating the output of said sampling means to obtain an integral indicative of the digital signal within the duration of the sampling interval;

bistable means for rapidly assuming a state in response to the integral and maintaining the assumed state for a duration of a time slot to produce an output signal indicative of the presence of a pulse during the sampling interval; and pulsing means for resetting said linear means by supplying a current pulse thereto after said bistable means assumes a state in response to the integral so that said integral is eliminated before the next successive sampling interval.

2. The regenerator as claimed in claim 1, wherein said sampling means further comprises second pulsing means for producing a pulse to define a sampling interval of a duration that is at least one-half the duration of said time slot.

3. The regenerator as claimed in claim 1, wherein said sampling means comprises first and second transistors having complementary digital signals respectively applied to their bases such that said first and second transistors are differentially controlled by said complementary digital signals, and said second pulsing means coupled to the emitters of said first and second transistors, said second pulsing means producing a pulse of operating current for said first and second transistors to control the sampling interval.

4. The regenerator as claimed in claim 3, wherein said linear means comprises first capacitive means connected to the collector of said first transistor and second capacitive means connected to the collector of said second transistor, the differential charge stored by said first and second capacitive means forming an integral indicative of the digital signal applied to said regenerator during the occurrence of the sampling interval.

5. The regenerator as claimed in claim 4 including diode means connected from said first and second capacitive means to said pulsing means and being operative in response to a pulse from the pulsing means to reset said first and second capacitive means.

6. The regenerator as claimed in claim 3 wherein said first and second transistors have first any second resistive elements in series with their emitters to insure linear operation of said transistors during the sampling interval.

7. In a digital transmission system operating on digital signals occupying predetermined time slots, a digital signal regenerator comprising:

generator means for producing a current pulse having a duration equal to a substantial portion of a time slot;

linear means for integrating the digital signal during the interval determined by the duration of said current pulse, said linear means storing an integral which is a portion of said current pulse, the magnitude of said integral being controlled by the digital signal present during said interval;

nonlinear means comprising a bistable circuit for evaluating said integral to produce an output signal indicative of the presence of a pulse during said interval; and pulsing means for resetting said linear means after said nonlinear means evaluates said integral so that said integral is eliminated before the next successive integrating interval.

* * * * *